Nov. 28, 1933.   R. S. M. MITCHELL   1,937,495
SHOCK ABSORBER
Filed Jan. 28, 1931
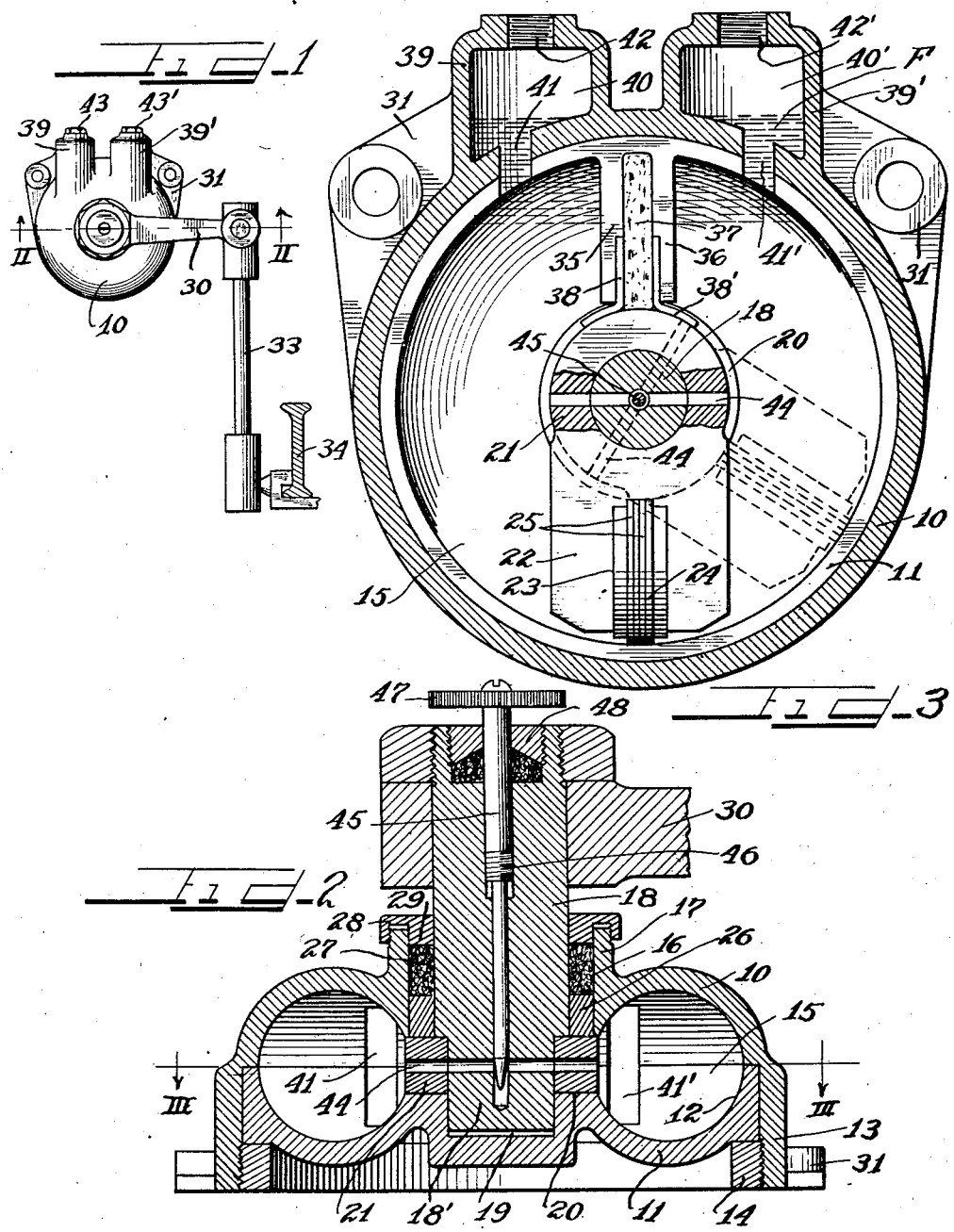
Inventor
Richard S. M. Mitchell Patented Nov. 28, 1933

1,937,495

UNITED STATES PATENT OFFICE 1,937,495

SHOCK ABSORBER

Richard S. M. Mitchell, Detroit, Mich., assignor of fifteen per cent to A. H. Golden, Stamford, Conn.

Application January 28, 1931. Serial No. 511,792

10 Claims. (Cl. 188—89)

My invention relates to shock absorbers which are particularly adapted for use in automotive vehicles for modifying the operation of the vehicle springs to prevent shock.

An important object of the invention is to produce a shock absorber of the polar type in which the relative movement between a cylinder structure and a piston structure is controlled in the main by the resistance to volume change of an elastic gas such as air.

A further object of the invention is to provide an arrangement in which the cylinder contains a liquid, such as oil, in which the piston travels and which liquid forms a mobile element which is moved by the piston to act against an enclosed volume of gas for causing compression thereof, the resistance to such compression being the retarding means which controls the movement of the piston and consequently the operation of the vehicle springs to be controlled.

A further object of the invention is to provide improved adjustable means for affording a relief passage for the flow of liquid from one side of the piston to the other in order to modify the resistance or retardation effect of the gas on the piston movement.

Still another object is to provide a simple, economically manufactured, and readily assembled shock absorber structure of the type referred to in which the construction will be such as to be inherently free of leakage without the incidental manufacture of the parts thereof to exact dimensions by precision instruments.

The above specified and other features of my invention are incorporated in the structure disclosed on the drawing, on which drawing Figure 1 is a side elevation of one end of a vehicle chassis structure showing the application of my improved shock absorber relative to the vehicle spring;

Figure 2 is a section on plane II—II of Figure 1;

Figure 3 is a section on plane III—III of Figure 2.

The structure shown comprises the outer substantially circular frame 10 and the inner frame 11. The frame 10 has the annular shoulder 12 within the flange 13, the frame 11 extending within the flange and seating at its periphery against the shoulder, a clamping ring 14 threading into the end of the flange and abutting against the frame 11 to securely hold it to the shoulder. The frames are shaped to form annular semi-circular recesses which, when the frames are secured together, form the annular cylinder bore 15.

The frame 10 has the axially extending opening 16 surrounded by the boss 17, a shaft 18 extending through this opening and having the reduced inner end 18' which has bearing in the pocket 19 formed in the frame 11.

The cylinder bore 15 surrounds and communicates with the cylindrical space 20 whose axial width is less than the diameter of the cylinder bore and this space 20 receives the cylindrical hub 21 which is integrally secured to the reduced end 18' of the shaft 18. An arm or wing 22 extends radially from the hub and transversely into the cylinder and has a radial slot 23 in which a suitable piston structure 24 is supported. The piston structure 24 has sealing rings 25 with which it floats relatively to the wing 22 with more or less freedom of movement in the slot 23. Sealing rings 25 are relatively quite thin and are loosely carried by the piston structure, so as to move relatively to one another and to the cylinder surface, so as to furnish the only contact means between the piston structure and the cylinder. Because of this construction of a plurality of relatively thin juxtaposed floating piston rings which follow the cylinder, it is possible to obtain an inherently tight fit between the piston and cylinder regardless, within reasonable limits of the roughness or unevenness of the inner surface of the cylinder, so that when the shaft rotates to swing the arm 22 the piston structure may accurately follow and engage the cylinder walls.

The cylinder contains an inelastic fluid F, preferably oil. To prevent leakage of this oil from the cylinder through the opening 16 a spacing and bearing ring 26 surrounds the shaft and abuts against the hub 21, the other face of this hub abutting against the frame 11. Outside of the bearing ring 26 suitable packing material 27 is inserted in the opening 16 and the opening is closed at the outer end by the cap 28 which has threaded engagement with the boss 17 and has the annular extension 29 extending into the opening 16 to engage against the packing, the pressure engagement compressing the packing and holding the bearing ring securely against the hub, the cap 28 affording additional bearing for properly aligning the shaft. At its outer end the shaft has an arm or lever 30 secured thereto. The frame 10 has flanges 31 extending therefrom by means of which the structure may be secured to a support such as the chassis frame 32 of an automotive vehicle. A link 33 is then provided for connecting between the end of the lever 30 and the axle 34 of the vehicle so that upon relative movement between the chassis and the axle the lever 30 will be swung and the shaft 18 oscillated.

Spaced apart walls 35 and 36 form a vertical partition above the hub 21 and these walls may form part of the frame 11. The walls terminate a distance short of the hub and receive packing material 37 which may be of leather. This packing extends between the frames 10 and 11 and engages against the hub, and L-shaped metallic supporting members 38 extend between the walls 35 and 36 to receive the packing material between them and their outer legs 38' are engaged by the hub 21, the hub exerting pressure against the supports 38 and the supports holding the lower end of the packing aligned and in intimate engagement with the hub and with the adjacent walls of the frames 10 and 11 so as to seal against the passage of oil at this point from one side of the piston structure to the other as the piston travels in the cylinder toward either side of the partition walls 35 and 36. The nature of the construction is such, that as the fluid pressure increases, the pressure against the leg portions 38' of members 38 will increase the sealing efficiency of these members.

The frame 10 has extensions 39 and 39' at the top, these frames forming chambers 40 and 40' for predetermined volumes of elastic gas such as air, the chambers having free communication with the ends of the cylinder through ports 41 and 41' respectively. The fluid level is such as to normally extend a slight distance above the ports so that the gas is confined in the chambers 40 and 40' above the liquid. In the upper walls of the gas chambers are openings 42 and 42', respectively, through which the oil may be filled into the cylinder and these openings may be closed by plugs 43 and 43' respectively.

When the shaft 18 is rotated and the arm 22 carried therewith the piston structure 24 will travel through the cylinder and the oil in advance thereof will be forced further up into the respective gas chamber so that the gas will be compressed. The oil behind the moving piston will be drawn away from the other gas chamber so that the gas in such chamber will be expanded, the respective compression and expansion of the gas volumes resisting and retarding the travel of the piston. To relieve and modify the effect on the piston travel of the volume change of the gas a relief passage 44 is provided and such passage extends diametrally through the hub 21 and the shaft 18. For adjusting the flow passage through said relief passageway a needle valve 45 may be provided and the valve may extend through a bore in the shaft 18 and have threaded connection therewith as indicated at 46 so that when the valve is turned by means of its knurled head 47 it will be axially adjusted and its needle end will more or less close the relief passage 44. To prevent leakage of oil through the valve receiving bore a stuffing box 48 may be provided in the end of the shaft as clearly shown on Figure 2.

Describing now the operation, suppose that when the vehicle has the normal load, the piston 24 will be at the bottom of the cylinder midway between its upper end. As the vehicle travels over comparatively smooth roadway the amplitude of vibration of the vehicle springs will be small and the piston will be oscillated through a correspondingly small amplitude. Movement of the piston toward the left (Figure 3) will cause the oil in advance of the piston to be carried farther into the chamber 40 and the gas therein will be compressed, while the oil in the wake of the piston will be partially withdrawn from the chamber 40' so that the gas in this chamber will be expanded. Owing to the short amplitude of oscillation of the piston such compression and expansion of the gas in the chambers will not create sufficient resistance to materially interfere with the oscillation of the piston and the normal vibration of the vehicle springs. However, should the vehicle encounter an abrupt obstruction which would tend to throw the wheel toward the chassis the piston will be correspondingly rapidly shifted in the cylinder. Referring to Figure 3, this piston movement would be toward the right and consequently the volume of oil forced along ahead of the piston will exert increased pressure against the gas in the chamber 40' and the resistance to compression will correspondingly retard the piston movement and tend to gradually check the movement. The oil behind the piston is drawn away from the chamber 40 and the gas in such chamber is expanded and the resistance to expansion will assist the resistance to compression of the gas in chamber 41 in retarding and checking the piston movement.

After the upward throw of the wheel has been checked the vehicle spring will tend to rebound and relax and such movement is assisted by the compression and expansion respectively in the gas chambers 40' and 40. However, as soon as the piston again reaches its lower or normal position and travels to the left from such position the gas in chamber 40 will be compressed and the gas in chamber 40' will be expanded and the resistance to such compression and expansion will check the movement of the piston and will consequently gradually check the recoil movement of the spring and absorb any shock.

In order to modify the gas resistance to the movement of the piston and to prevent too abrupt checking, the relief pass 44 referred to is provided. The available flow area through this pass is adjusted by the needle valve 45 and is comparatively small. During the short amplitude of oscillation of the piston while the car is traveling over comparatively smooth roadway, very little fluid will pass through this relief pass on account of the resistance therethrough and the inertia of the oil owing to the rapidity of oscillation of the piston, and therefore practically all of the momentum of the oil shifted by the piston will be expended in compressing and expanding the gas in the gas chambers and this will be the operation as the vehicle travels over the minor projections or depressions which might be encountered on roadways such as concrete, brick or macadam. However, when an abnormal obstruction is encountered and the piston is suddenly shifted a greater distance, then the pressure of the oil which is increased by the increasing resistance of the gases will cause oil to flow through the relief pass from the pressure side of the cylinder to the other side. Such relief or bleed flow of the oil will ease up the pressure and the retardation effect of the gas will be more gradual. Should the obstruction encountered cause an abnormally great movement of the piston, the corresponding end of the diametrically extending relief pass 44 will eventually come into position under the corresponding one of the metal supports 38 and 38'. For example, suppose that the piston is suddenly shifted along the cylinder towards the right an abnormal distance, the corresponding end of the relief pass 44 will come into position below the packing supporting member 38' and then the relief passageway will be closed so that during any further movement of the piston the resistance of the air in the air chambers to compression or expansion will alone resist further travel of the piston and the piston movement will be rapidly checked and stopped.

The relief pass 44 serves also the purpose of permitting a free neutral start of the piston from any point in the cylinder. For example, suppose that the vehicle has an abnormal load. Then the piston, upon application of the load, will be shifted toward the right (Figure 3) and such movement will tend to compress the gas in chamber 40' and cause expansion of the gas in chamber 40. However, as soon as the vehicle comes to rest after application of the load the resistance at opposite sides of the piston will be neutralized by the flow of oil through the relief pass and then the shock absorber is free to function when the vehicle travels to allow the vehicle spring to function freely over practically smooth roadway and to check and absorb shocks when the vehicle travels over obstructions or inequalities in the roadway.

I thus provide a shock absorber of the polar type in which the resistance of confined bodies of elastic gas such as air is depended upon in the main to counteract and modify the operation of vehicle springs and absorb shocks, with such action of the gas modified to a certain extent by the interflow of oil from one side of the piston to the other. The structure shown is of simple design which can be economically manufactured and assembled, and there being no springs or movable valves, there is very little in the structure to get out of order. All the necessary lubrication is taken care of by the oil in the cylinder.

I have shown a practical and efficient embodiment of the various features of my invention but I do not desire to be limited to the details shown as changes and modifications in construction, arrangement and operation may be made without departing from the scope and spirit of the invention as outlined in the appended claims.

I claim as follows:

1. In a device of the class described, the combination of a cylinder housing comprising outer and inner frames secured together to define an annular cylinder bore, one of said frames having a passage extending to the exterior and being concentric with said bore, a cylindrical space surrounded by said annular bore below said passage, a shaft extending through said passage and through said space, a hub within said space and secured to the inner end of said shaft to rotate therewith, a piston structure supported by said hub for moving in said bore when said shaft is rotated, a partition extending across said bore to form a head relative to which said piston moves in said bore, an incompressible fluid in said cylinder bore displaced therein by the travel of said piston, and an enclosed chamber at each side of said head communicating with the respective end of said bore, said enclosed chambers containing an elastic gas for resisting the displacement of said liquid and thereby retarding and checking the movement of said piston through said bore, and a relief passage for flow of liquid from one side of the piston to the other for modifying the retarding effect of said gas.

2. In a device of the class described, the combination of a cylinder housing comprising outer and inner frames secured together to define an annular cylinder bore, one of said frames having a passage extending to the exterior and being concentric with said bore, a cylindrical space surrounded by said annular bore below said passage, a shaft extending through said passage and through said space, a hub within said space and secured to the inner end of said shaft to rotate therewith, a piston structure supported by said hub for moving in said bore when said shaft is rotated, a partition extending across said bore to form a head relative to which said piston moves in said bore, an incompressible fluid in said cylinder bore displaced therein by the travel of said piston, and an enclosed chamber at each side of said head communicating with the respective end of said bore, said enclosed chambers containing an elastic gas for resisting the displacement of said liquid and thereby retarding and checking the movement of said piston through said bore, and a relief passage for flow of liquid from one side of the piston to the other for modifying the retarding effect of said gas, and means for adjusting the size of said relief passage.

3. In a device of the class described, the combination of a cylinder housing comprising outer and inner frames secured together to define an annular cylinder bore, one of said frames having a passage extending to the exterior and being concentric with said bore, a cylindrical space surrounded by said annular bore below said passage, a shaft extending through said passage and through said space, a hub within said space and secured to the inner end of said shaft to rotate and rotate therewith, a piston structure supported by said hub for moving in said bore when said shaft is rotated, a partition extending across said bore to form a head relative to which said piston moves in said bore, an incompressible fluid in said cylinder bore displaced therein by the travel of said piston, and an enclosed chamber at each side of said head communicating with the respective end of said bore, said enclosed chambers containing an elastic gas for resisting the displacement of said liquid and thereby retarding and checking the movement of said piston through said bore, and a relief passage for flow of liquid from one side of the piston to the other for modifying the retarding effect of said gas, and means for adjusting the size of said relief passage, and means for automatically entirely closing said relief pass after a predetermined distance of movement of said piston in either direction.

4. In a shock absorbing device of the class described, the combination of a housing forming an annular cylinder containing an incompressible fluid, a shaft extending into said housing and supporting a piston structure for travel in the cylinder bore when the shaft is rotated, a partition wall across said cylinder forming the head relatively to which said piston travels, said piston structure embodying a plurality of relatively thin independently floating juxtaposed sealing rings forming the sole contact between the piston structure and the cylinder, whereby to compensate inherently for unevenness in the cylinder surface and to form an inherently tight structure.

5. In a device of the class described, the combination of a cylinder housing comprising outer and inner frames secured together to define an annular cylinder bore, a piston in said cylinder bore adapted to rotate therein against the resistance of a fluid contained in the cylinder, a partition extending across said bore to form a head against which said piston may rotate in said bore, an enclosed chamber communicating with the cylinder on a side of the head against which the piston moves during shock absorbing action, said chamber containing an elastic gas for resisting the displacement of liquid in the cylinder by said piston, and a relief valve for permitting the flow of liquid from one side of the piston and head to the other side of the piston and head for modifying the retarding effect of said gas and liquid.

6. In a device of the class described, the combination of a cylinder housing comprising outer and inner frames secured together to define an annular cylinder bore, a piston in said cylinder bore adapted to rotate therein against the resistance of a fluid contained in the cylinder, a partition extending across said bore to form a common head against which said piston may move when rotated in either of its possible directional movements, an enclosed chamber communicating with the cylinder on a side of the partition head against which the piston moves during shock absorbing action, said chamber containing an elastic gas for resisting displacement in the cylinder of said piston, and a relief valve for permitting the flow of liquid from one side of the piston and the common head to the other side of the piston and head for modifying the retarding effect of said gas and liquid.

7. In a device of the class described, the combination of a cylinder housing comprising outer and inner frames secured together to define an annular cylinder bore having a slot in its inner wall communicating with the center of said housing, a hub in said housing rotatable relatively thereto, a flange on said hub closing said slot and a wing on said flange extending into the cylinder bore, a piston structure carried by said wing and adapted to rotate in said cylinder against the resistance of a fluid contained therein, a partition extending across said bore to form a head relative to which said piston moves in the bore, an enclosed chamber communicating with the cylinder on a side of the head against which the piston moves during shock absorbing action, said chamber containing an elastic gas for resisting the displacement of the liquid in the cylinder by said piston, and a relief valve for permitting the flow of liquid from one side of the piston and head to the other side of the piston and head for modifying the retarding effect of said gas and liquid.

8. In a device of the class described, the combination of a housing forming an annular cylinder, a shaft extending into said housing and supporting a piston for travel in the cylinder bore when the shaft is rotated, a partition wall across said cylinder forming a head relative to which said piston travels, incompressible fluid in said cylinder, an inner chamber in said wall containing a packing material pressing against said shaft, and metallic fluid sealing means on each side of said packing material and bearing circumferentially against the shaft on each side of said wall whereby increased pressure of said liquid tends to increase the effectiveness of the sealing means.

9. In a device of the class described, the combination of a housing forming an annular cylinder, a shaft extending into said housing and supporting a piston for travel in the cylinder bore when the shaft is rotated, a partition wall across said cylinder forming a head relative to which said piston travels, incompressible fluid in said cylinder, spring metal sealing means carried by said wall and extending from each side thereof into substantial circumferential contact with said shaft whereby increased pressure of said liquid tends to increase the effectiveness of said spring metal sealing means.

10. In a device of the class described, the combination of a housing forming a cylinder containing an incompressible fluid, a shaft extending into said housing and having means for supporting a piston structure for travel in the cylinder bore when the shaft is rotated, a partition wall across said cylinder forming a head relatively to which said piston structure travels, said piston structure embodying a plurality of relatively thin independently floating juxtaposed sealing rings forming the sole contact between the piston structure and the cylinder, whereby to compensate inherently for unevenness in the cylinder surface and to form an inherently tight structure.

RICHARD S. M. MITCHELL.